United States Patent
Pierce et al.

[11] 3,863,124
[45] Jan. 28, 1975

[54] AERODYNAMIC SPACING CONTROL APPARATUS FOR MAINTAINING A DESIRED SPACING BETWEEN A SIGNAL TRANSDUCER AND A RECORDING SURFACE BY SENSING ELECTRICAL NOISE

[75] Inventors: Ernest E. Pierce, Dayton; Thomas R. McColloch, Centerville, both of Ohio

[73] Assignee: NCR Corporation, Dayton, Ohio

[22] Filed: Feb. 15, 1973

[21] Appl. No.: 332,893

[52] U.S. Cl. ........... 318/638, 318/644, 318/646, 318/576, 318/676, 310/8.1, 360/103
[51] Int. Cl. .................. G05b 1/06, G11b 5/60
[58] Field of Search ........ 318/676, 576, 638, 644, 318/646; 310/8.1; 360/103

[56] References Cited
UNITED STATES PATENTS

| | | | |
|---|---|---|---|
| 3,292,168 | 12/1966 | Gray | 318/576 X |
| 3,614,579 | 10/1971 | Fulton | 318/676 |
| 3,632,900 | 1/1972 | Kurzweil, Jr. | 360/103 |
| 3,657,710 | 4/1972 | Billawala | 360/103 |

OTHER PUBLICATIONS
IBM Tech. Bull., Vol. 12, No. 8, Jan. 1970, pg. 1232, "Control of Slider Aerodynamics in Disk Files," Nystrom et al.

*Primary Examiner*—T. E. Lynch
*Attorney, Agent, or Firm*—J. T. Cavender; Wilbert Hawk, Jr.; John J. Callahan

[57] ABSTRACT

Spacing control apparatus for maintaining the spacing between a signal transducer and a magnetic recording surface. A spacing control device having a surface which is deformable in a direction towards or away from the recording surface is utilized. The spacing control device is coupled to the signal transducer for movement therewith, and its surface coacts with the gas flow layer between the signal transducer and the recording surface to cause the signal transducer to be moved towards or away from the recording surface in order to maintain a desired spacing. Electrical control signals are developed which are indicative of the difference between the actual spacing and the desired spacing between the signal transducer and the recording surface. The electrical control signals are developed by comparing the electrical output signals of a signal transducer, which output signals are related to the amount of magnetic noise developed upon reading of the magnetic recording surface by the signal transducer, with a reference signal, which is related to the amount of magnetic noise developed upon reading of the magnetic surface when the signal transducer and the recording surface are at the desired spacing. The electrical control signals are applied to the spacing control device to cause deformation of its surface which, in turn, controls the spacing of the signal transducer from the recording surface.

4 Claims, 1 Drawing Figure

PATENTED JAN 28 1975

3,863,124

AERODYNAMIC SPACING CONTROL APPARATUS FOR MAINTAINING A DESIRED SPACING BETWEEN A SIGNAL TRANSDUCER AND A RECORDING SURFACE BY SENSING ELECTRICAL NOISE

BACKGROUND OF THE INVENTION

There have been provided many and varied apparatuses for spacing a signal transducer with respect to a recording surface, such as a magnetic disc, where there is relative motion between the signal transducer and the recording surface.

Where the recording surface moves relative to the signal transducer, it is usually desirable to space the transducer close to but not in contact with the recording surface and to maintain that spacing at a desired value.

It is well known that the rapid relative movement of the recording surface and the signal transducer generates a gas flow layer or laminar air flow between them. The rapidly moving gas flow layer may be used to cause a signal transducer to "fly" or float at a given distance from the recording surface. The prior art disclosed several methods by which signal transducers may be caused to "fly" by utilizing a fluid bearing. However, many problems are encountered in designing fluid bearing means for maintaining the spacing between a signal transducer and a recording surface at a desired value, especially where the relative speed of the signal transducer and recording surface is susceptible of change. Also, prior art spacing control apparatuses which rely on known fluid bearing arrangements, for relative positioning of the signal transducer, are susceptible to undesirable "crashing" of the signal transducer on the recording surface.

One example of prior art is U.S. Pat. No. 3,183,516, which shows and describes an electrostrictive control device for positioning a signal transducer towards or away from a recording surface. The control device, which includes an electrostrictive element, is utilized for supporting the signal transducer on an access arm and for moving the transducer in response to a control signal. However, the electrostrictive element does not coact with the gas flow layer which is present between the signal transducer and the recording surface in order to control the spacing between the signal transducer and the recording surface. The foregoing patent also describes that the control signal may be based on the signal level output of the signal transducer, which control signal may be utilized to increase or decrease the force exerted on the signal transducer to correct or optimize the signal level produced therefrom. However, this patent does not disclose that the control signal is based on the amount of magnetic noise output of the signal transducer.

A further example of prior art is disclosed in U.S. Pat. No. 3,614,579 which shows apparatus for maintaining a desired spacing between a signal transducer and a recording surface which comprises a piezoelectric transducer. The piezoelectric transducer is coupled to the signal transducer for motion therewith. Enerization of the piezoelectric transducer by a control signal provides a pressurized gas film between the signal transducer and the recording surface for spacing the signal transducer from the recording surface. However, the piezoelectric transducer does not coact with the gas flow layer which is present between the signal transducer and the recording surface, by reason of relative motion between the two, to control the spacing between the signal transducer and the recording surface. This patent also describes that the control signal may be based on the difference between a signal representative of the actual spacing and a signal representative of the desired spacing between the signal transducer and the recording surface. The actual spacing signal is shown and described as being developed by a position sensor of the capacitive or inductive type, while the desired spacing signal is a voltage reference signal. However, this patent does not disclose that the control signal is based on the amount of magnetic noise output of the signal transducer.

SUMMARY OF THE INVENTION

The present invention relates to spacing control apparatus for maintaining the spacing between a signal transducer and a magnetic recording surface at a desired value.

In accordance with one aspect of the present invention, the spacing control apparatus comprises spacing control means including an element having a surface which is deformable in a first or a second direction towards or away from the recording surface in response to electrical signals applied thereto. There is provided means coupling the spacing control means to the signal transducer for movement therewith in the first or the second direction, wherein the deformable element surface coacts with a gas flow layer existing between the signal transducer and the recording surface upon relative movement between the signal transducer and the recording surface in a further direction. Deformation of the element surface causes both the spacing control means and the signal transducer to be moved in the first or the second direction. In addition, there is provided means applying electrical control signals to the element. The electrical control signals are indicative of the difference between the actual spacing and the desired spacing between the signal transducer and the recording surface and they control deformation on the surface of the element to maintain the spacing at the desired value.

In accordance with another aspect of the present invention, the spacing control apparatus comprises means providing electrical output signals having an amplitude level related to the amount of magnetic noise developed upon reading of the magnetic recording surface. The amplitude level of the output signals are indicative of the actual spacing between the signal transducer and the recording surface. There is provided a reference signal source providing a reference signal output having an amplitude level related to the amount of magnetic noise developed upon reading of the recording surface when the signal transducer and the recording surface are at the desired spacing. There is provided means responsive to the electrical output signals and to the reference signal output producing electrical control signals indicative of the difference between the actual spacing and the desired spacing. In addition, spacing control means associated with the signal transducer, and which is responsive to electrical signals applied thereto, is provided. The spacing control means controls the spacing of the signal transducer means from the recording surface. And, there is further provided means applying the electrical control signals to the spacing control means to maintain the spacing at the desired value. The spacing control means may comprise an element having a deformable surface, and in addition, the deformable surface may be or may not coact with the gas layer generated upon relative motion between the signal transducer and the recording surface in the further direction. Since the electrical control signals are determined by the amount of magnetic noise developed upon reading of the magnetic recording surface and magnetic noise is developed whether or not information or data signals are recorded on the recording surface, then the spacing control apparatus is operative to maintain the desired spacing during all time periods that the recording surface is being read. Also, since measuring or monitoring of the spacing between the signal transducer and the recording surface is accomplished by magnetic noise sensing rather than recorded signal, capacitive or optical sensing for example, the signal transducer and the recording surface are maintained at the desired spacing wherein magnetic noise, read along with recorded signal information, will have a less deleterious effect as regards recovery and utilization of the recorded signal information.

In view of the foregoing, it is an object of the present invention to provide a novel spacing control apparatus for maintaining a desired spacing between a signal transducer and a recording surface which includes an element movable with the signal transducer, which element has a surface which is deformable in response to electrical control signals applied thereto, wherein the deformable surface coacts with a gas flow layer existing between the signal transducer and the recording surface, and wherein deformation of the deformable surface, as determined by electrical control signals applied thereto, causes the signal transducer to be moved towards or away from the recording surface to maintain the desired spacing.

It is another object of the present invention to provide an improved spacing control apparatus for maintaining a desired spacing between a signal transducer and a recording surface which includes a spacing control means to which electrical control signals are applied, wherein the electrical control signals are indicative of the difference between the actual spacing and the desired spacing between the signal transducer and the recording surface as determined by the amount of magnetic noise developed upon reading of the recording surface.

BRIEF DESCRIPTION OF THE DRAWING

For a more complete understanding of applicant's invention, reference may be had to the following detailed description in conjunction with the drawing wherein.

DESCRIPTION OF THE PREFERRED EMBODIMENT

Figure 2:
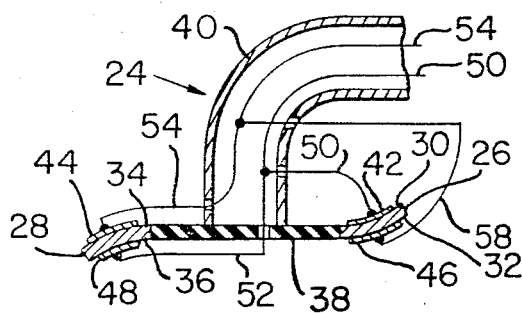
FIG. 2 is a cross-sectional view taken along the line 2—2 of FIG. 1 showing in greater detail the spacing control means used in the system of FIG. 1.
Figure 1:
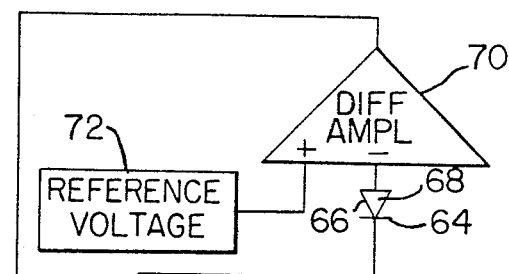
FIG. 1 is a perspective diagrammatic view of a portion of a magnetic disc memory system embodying the spacing control apparatus of the present invention.
Figure 1:
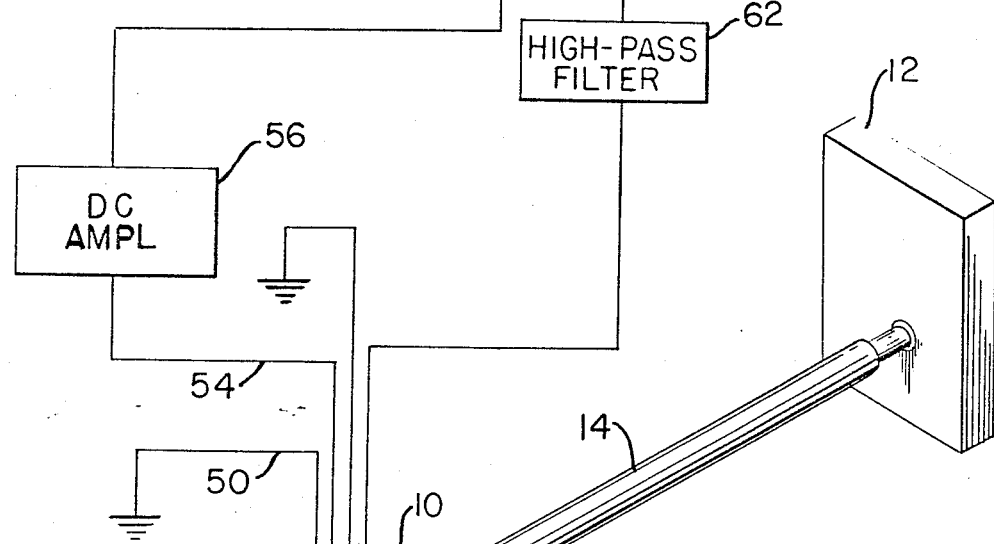
Figure 1:
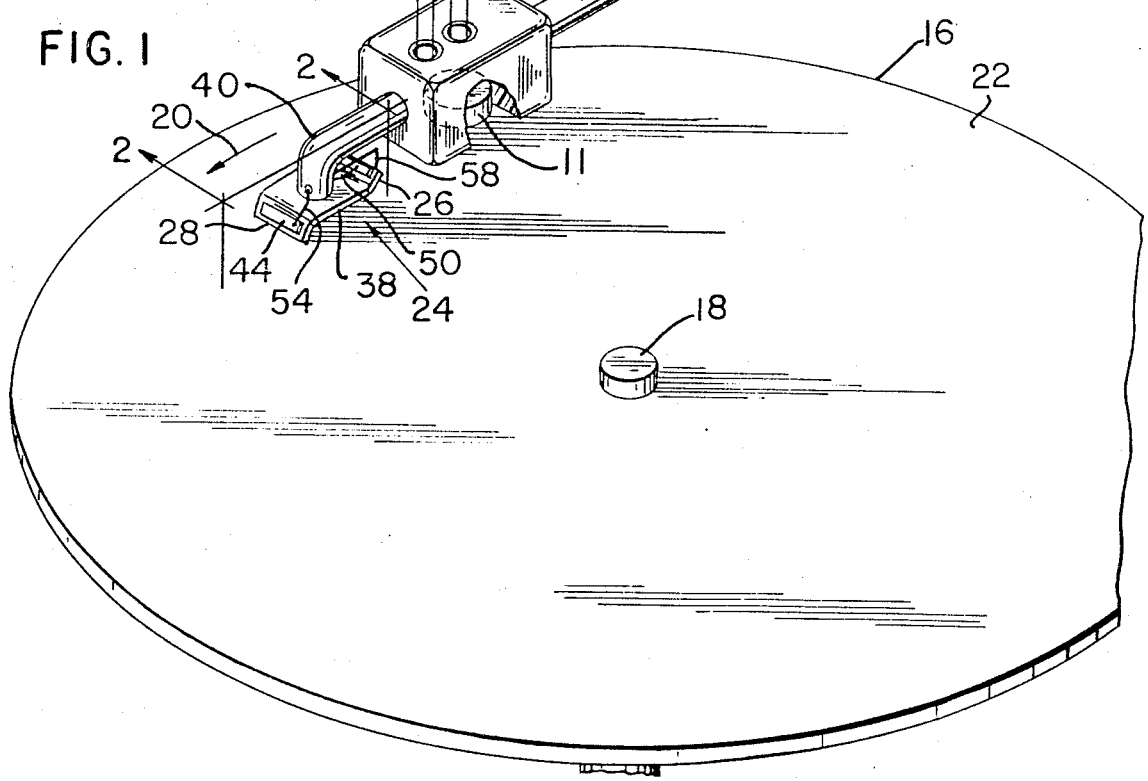

Referring now to FIGS. 1 and 2, the magnetic disc memory system portion includes a signal transducer assembly or means 10 which is coupled to a supporting member 12 by a telescopic-type suspension rod 14. The signal transducer means 10 contains a magnetic pickup or read signal transducer 11 fixedly positioned therein.

Below the signal transducer means 10, there is positioned a rotatable magnetic disc 16 on a rotatable drive shaft 18. The magnetic disc 16 is rotated in a counter-clockwise direction, indicated by the arrow 20, by means of a motor (not shown) which is coupled to the drive shaft 18. The magnetic disc 16 has a recording surface 22 which contains data information recorded therein as represented by magnetization areas having more or less magnetization. Since spurious magnetization usually is present in the magnetization areas of the recording surface 22, regardless of whether data information is also recorded therein, magnetic noise is developed upon reading of the recording surface 22. This magnetic noise is utilized in accordance with the present invention in order to maintain a desired spacing between the signal transducer 11 and the recording surface 22.

In accordance with the present invention, a spacing control means 24 is coupled to the signal transducer means 10 and is movable therewith in a first or a second direction towards or away from the recording surface 22. The spacing control means 24 includes two elements 26 and 28, each of which have opposed surfaces 30 and 32, and 34 and 36, respectively, as shown in detail in FIG. 2. The surfaces 30, 32, 34 and 36 are deformable in response to electrical signals applied thereto. The elements 26 and 28 are composed of a deformable material, such as piezoelectric or electrostrictive materials. An example of a material that may be utilized for the elements 26 and 28 is barium titanate. The elements 26 and 28 are attached, by means of a suitable material, such as epoxy, to the edges of an electrically insulative support member 38. The support member 38 is attached to one end of a tubular member 40, the other end of which is attached to the signal transducer means 10.

As shown in detail in FIG. 2, the elements 26 and 28 of the spacing control means 24 have upper metal electrode plates 42 and 44 located on their upper surfaces 30 and 34, respectively, and lower metal electrode plates 46 and 48 located on their lower surfaces 32 and 36, respectively. The plates 42, 44, 46 and 48 are formed by depositing aluminum onto the surfaces of the elements 26 and 28.

One end of an electric lead 50 is connected to the plate 42 while its other end is connected to ground potential (FIGS. 1 and 2). Another lead 52 interconnects the lead 50 and the plate 48. One end of still another lead 54 is connected to the plate 44, while its other end is connected to the output of a direct current amplifier 56. A further lead 58 interconnects the lead 54 and the plate 46. The leads 50, 52, 54 and 58 provide means for applying electrical control signals to the elements 26 and 28.

As the spacing control means 24, including the elements 26 and 28, is mounted for movement with the signal transducer means 10 in the gas flow layer generated as a result of rapid relative movement of the recording surface 22 and the signal transducer means 10, the elements 26 and 28 will act as air foil members and control the spacing between the recording surface 22 and the signal transducer 11. The elements 26 and 28 provide an aerodynamic lift for the spacing control means 24 which, in turn, is translated to the signal transducer 11. The amount of the foregoing aerodynamic lift is determined by the angle at which the surfaces of the elements 26 and 28 coact with the gas flow layer and such angle is controlled by deformation of such surfaces.

The elements 26 and 28 of the spacing control means 24 are composed of barium titanate material which exhibits an electrical polarity in deformation. Accordingly, when electrical control signals, which consist of a negative voltage on the leads 54 and 58, are applied to the elements 26 and 28, the element 26 will deform or bend upward and the element 28 will deform or bend downward to thus raise the spacing control means 24 and the signal transducer 11 in the gas flow layer away from the recording surface 22. The foregoing deformation or bending of the elements 26 and 28 is brought about since their surfaces 30, 32, 34 and 36 are deformable in response to electrical control signals applied thereto. Thus, the surfaces 30, 32, 34 and 36, which have applied to them a more negative voltage with respect to its opposed surface, will become convex. And, the surfaces 30, 32, 34 and 36, which have applied to them a less negative voltage with respect to its opposed surface, will become concave. Accordingly, when the surfaces 32 and 34 are charged negatively with respect to the surfaces 30 and 36 respectively, the element 26 will bend upward and the element 28 will bend downward, as shown in FIG. 2. In this case, the gas flow layer which exists adjacent to the recording surface 22 will coact with the elements 26 and 28 to raise the spacing control means 24 and the signal transducer 11 away from the recording surface 22. In a similar manner, when the surfaces 30 and 36 are charged positively with respect to the surfaces 32 and 34 respectively, the element 26 will bend downward and the element 28 will bend upward. In this latter case, the gas flow layer will coact with the elements 26 and 28 to lower the spacing control means 24 and the signal transducer 11 towards the recording surface 22. Thus, the spacing control means 24 is effective to control the spacing between the signal transducer 11 and the recording surface 22 in accordance with electrical control signals applied thereto.

Alternatively, the recording surface 22 may remain stationary while the signal transducer means 10 and its signal transducer 11 are rotated over it. The spacing control means 24 will operate to cause the signal transducer 11 to "fly" at a selected distance above the stationary magnetic surface 22.

Whether the spacing control means 24 is utilized with a magnetic disc memory system in which the recording surface 22 is stationary or moving during a read or signal reproducing operation, electrical control signals indicative of the difference between the actual spacing and the desired spacing between the signal transducer 11 and the recording surface 22 are applied to the spacing control means 24 to maintain the desired spacing. In FIG. 1, there is shown a particularly advantageous manner for developing electrical control signals of the foregoing type.

As shown in FIG. 1, the recording surface 22 is rotating in a counterclockwise direction below and adjacent to the signal transducer 11. A thin gas flow layer or laminar air stream is present between the signal transducer 11 and the recording surface 22 by reason of the rotation of the recording surface 22. For instance, the gas flow layer is present within a distance of 0.005 inch from the recording surface 22. The signal transducer 11 is spaced from the recording surface 22 and cooperates therewith in reproducing data therefrom. The signal transducer 11 may be so connected that it may be utilized for both recording on and reproduction from the recording surface 22, or a separate signal transducer may be contained in the signal transducer means 10 for the recording of data information on the recording surface 22. The signal transducer 11 is operative during a reading operation to detect any data information stored on the recording surface 22 together with any magnetic noise that is present in the recording surface 22. A magnetic noise output signal is developed in the signal transducer 11 because of the rotation of the recording surface 22. The developed magnetic noise output signal is superimposed on the data information signal. Magnetic noise is present in the recording surface 22 regardless of whether data information is stored thereon, so that during a reading operation, the signal transducer 11 will detect the magnetic noise whether or not it is associated with or exists with the data information. Accordingly, the output of the signal transducer 11 is applied to a high-pass filter 62 which passes the magnetic noise output signal of the signal transducer 11 to the cathode 64 of a diode 66 whose plate 68 is coupled to a first input of a differential amplifier 70. The diode 66 operates as a half-wave rectifier for the magnetic noise output signal of the signal transducer 11. The high-pass filter 62 operates to separate the magnetic noise output signal of the signal transducer 11 from any lower frequency data information signals sensed thereby. Electrical output signals appearing at the plate 68 of the diode 66 will have an amplitude level related to the amount of magnetic noise developed upon reading of the recording surface 22 by the signal transducer 11 and such amplitude level will be indicative of the actual spacing between the signal transducer 11 and the recording surface 22. The reference signal output of a reference signal source 72 is applied to a second input of the differential amplifier 70. This reference signal output will have an amplitude level related to the amount of magnetic noise developed upon reading of the recording surface 22 when the signal transducer 11 and the recording surface 22 are at a desired spacing.

The signal output of the differential amplifier 70 is applied through the direct current amplifier 56 to the lead 54 of the spacing control means 24. Accordingly, electrical control signals are applied to the spacing control means 24 which are indicative of the difference between the actual spacing and the desired spacing between the signal transducer 11 and the recording surface 22.

In operation, when the signal transducer 11 moves closer to the recording surface 22 in the gas flow layer above the recording surface 22, and away from the desired spacing therebetween, the voltage of the magnetic noise output signal increases at the first input to the differential amplifier 70 relative to the reference signal output from the reference signal source 72. Accordingly, the voltage output signal of the differential amplifier 70 will be negative since the voltage at the output of the diode 66 will be greater than the reference signal output of the reference signal source 72. As a result, the voltage of the output signal of the direct current amplifier 56 will also increase. As the voltage of the signal applied to the elements 26 and 28 of the spacing control means 24 becomes more negative, the element 26 will bend upward away from the gas flow layer and the element 28 will bend downward into it. The concave shape of the lower surface 36 of the element 28 and the convex shape of the lower surface 32 of the element 26 will cause the signal transducer 11 to raise in the gas flow layer. As a result, the signal transducer 11 will be lifted upward from the recording surface 22 so that the desired spacing therebetween will be maintained and the signal transducer 11 will be prevented from coming into contact with the recording surface 22.

When the signal transducer 11 moves away from the recording surface 22 in the gas flow layer and away from the desired spacing therebetween, the voltage of the magnetic noise signal decreases at the first input to the differential amplifier 70 relative to the reference signal output from the reference signal source 72. Accordingly, the voltage output of the diode 66 will be less than the reference signal output of the reference signal source 72. As a result, the voltage of the output signal of the direct current amplifier 56 will become positive. As the voltage of the signal applied to the elements 26 and 28 of the spacing control means 24 becomes positive, the element 26 will bend downward into the gas flow layer and the element 28 will bend upward away from it. As a result, the signal transducer 11 will be lowered towards the recording surface 22 so that the desired spacing therebetween will be maintained.

While the invention has been particularly shown and described with reference to a preferred embodiment thereof, it will be understood by those skilled in the art that various changes in form and details may be made therein without departing from the spirit and scope of the invention.

What is claimed is:

1. In combination with a magnetic recording surface and a signal transducer spaced from the recording surface, the signal transducer being movable relative to the recording surface in a first or a second direction towards or away from the recording surface respectively, the spacing between the signal transducer and the recording surface being subject to variations in the first and the second directions from a desired value during relative motion between the signal transducer and the recording surface in a further direction, and wherein a gas flow layer exists between the signal transducer and the recording surface during the relative motion in the further direction, spacing control apparatus for maintaining the spacing at the desired value comprising:

means providing electrical output signals indicative of the actual spacing between the signal transducer and the recording surface including the signal transducer, the electrical output signals being a function of the amount of magnetic noise output of the signal transducer during reading of the recording surface;

means responsive to the electrical output signals producing electrical control signals indicative of the difference between the actual spacing and the desired spacing between the signal transducer and the recording surface including a reference signal source providing a reference signal corresponding to the desired spacing between the signal transducer and the recording surface, differential amplifier means, and means applying the reference signal to the differential amplifier means;

spacing control means comprising at least a first element having a surface which is deformable at various angles with respect to said gas flow layer and in a direction towards or away from the recording surface in response to electrical control signals applied thereto;

means coupling the spacing control means with the signal transducer for movement therewith in the first or the second direction, deformation of the first element surface causing both the spacing control means and the signal transducer to be moved in the first or the second direction; and means applying the electrical control signals to the first element to control deformation of the surface of the first element and maintain the spacing at the desired value.

2. Apparatus according to claim 1 wherein the means providing electrical output signals indicative of the actual spacing between the signal transducer and the recording surface further comprises high-pass filter means and half-wave rectifying means connected in series between the signal transducer and the means providing electrical control signals.

3. In combination with a magnetic recording surface and a signal transducer spaced from the recording surface, the signal transducer being movable relative to the recording surface in a first or a second direction towards or away from the recording surface respectively, the spacing between the signal transducer and the recording surface being subject to variations in the first and the second directions from a desired value during relative motion between the signal transducer and the recording surface in a further direction, spacing control apparatus for maintaining the spacing at the desired value comprising:

means providing electrical output signals having an amplitude level related to the amount of magnetic noise developed upon reading of the recording surface, the amplitude level of the electrical output signals being indicative of the actual spacing between the signal transducer and the recording surface;

a reference signal source providing a reference signal output having an amplitude level related to the amount of magnetic noise developed upon reading of the recording surface when the signal transducer and the recording surface are at the desired spacing;

means responsive to the electrical output signals and to the reference signal output producing electrical control signals indicative of the difference between the actual spacing and the desired spacing;

spacing control means associated with the signal transducer, responsive to electrical control signals applied thereto, controlling the spacing of the signal transducer from the recording surface; and means applying the electrical control signals to the spacing control means to maintain the spacing at the desired value.

4. Apparatus according to claim 3 wherein the spacing control means comprises a first element having a surface which is deformable at various angles with respect to said gas flow layer in response to the electrical control signals, deformation of the surface of the first element in response to the electrical control signals causing the controlling of the spacing of the signal transducer from the recording surface.

* * * * *